July 26, 1927.
E. LANDON
AIR STORING SHOCK ABSORBER
Filed May 17, 1926
1,636,915
Fig. 1.
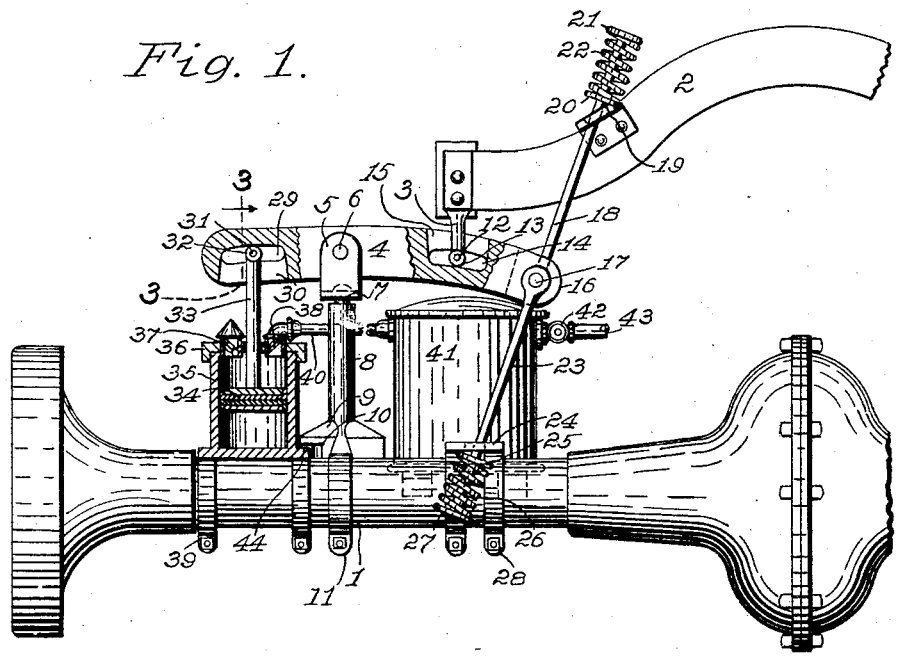
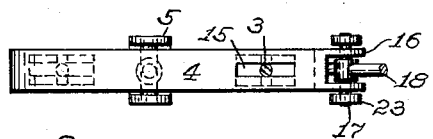
Fig. 2.
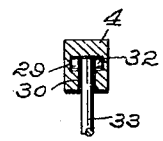
Fig. 3.
Fig. 4    Fig. 5.
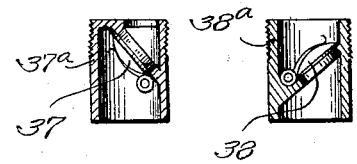
Inventor
Elvie Landon
By G. C. Kennedy
Attorney Patented July 26, 1927.

1,636,915

UNITED STATES PATENT OFFICE.

ELVIE LANDON, OF WATERLOO, IOWA.

AIR-STORING SHOCK ABSORBER.

Application filed May 17, 1926. Serial No. 109,737.

My invention relates to improvements in air storing shock absorbers, and one object of my improvements is to supply intermediate mechanism between relatively separated and movable elements of a vehicle and including air compressing means and reaction springs to resiliently support one element relative to another.

Another object is to collect and store for any desired uses, air compressed by the air compressing means forming a part of the invention.

These objects are accomplished by the means which are hereinafter described and claimed, and which are illustrated in the accompanying drawings, it being understood that changes in the precise embodiment of invention herein disclosed can be made within the scope of what is claimed without departing from the spirit of the invention.

In said drawings, Fig. 1 is a rear elevation of part of the rear axle housing of an automobile and of the frame, showing my improved apparatus connected between said parts, with portions sectioned or broken away. Fig 2 is a detail top plan of the walking-beam of the device, and Fig. 3 is a cross section of said beam taken on the broken line 3—3 of said Fig. 1. Figs. 4 and 5 are cross sections of the conventional valve-chambers 37ᵃ and 38ᵃ of the cylinder 35.

The numeral 1 denotes a rear axle housing of a motor-car, with part broken away, and 2 denotes a part of the rear cross-beam of the frame thereabove, both being of the Ford type.

4 denotes a walking-beam supported rockingly at a place to one side of its middle on a pintle 6 connecting furcations 5, the latter having a depending stem mounted for horizontal rocking in a socket in the top of a standard 8 secured upon the housing 1 by means of a detachable clamp 11. The outer part of the widened base 9 of said standard 8 is undercut at 10 in its outer side providing an overhanging shoulder over an arcuate riser, whose use will be hereinafter described. On one rear angle of the frame 2 is fixed a depending stem 3 having a terminal cross-pintle 12 which carries on its opposite ends anti-friction rollers 13 which extend through a narrow slot 15 in the top of the walking-beam 4 into a transversely widened longitudinal cavity, and the rollers 13 roll lengthwise in said cavity being retained by the side shoulders thereabove, within a limited scope of rocking movement of the beam.

I have adopted resilient mountings for this end of the walking-beam as follows. This end of the beam has furcations 16 connected by a pintle 17. A sleeve is fixed on the pintle intermediate said furcations and has an upwardly inclined arm 18 which traverses a slotted aperture in a bracketed angle-plate 19 on the frame part 2. The arm 18 has a terminal head 21 and an apertured annular plate 20 is mounted loosely on the arm immediately above the bracket 19. A coiled compression spring 22 is mounted on the arm engaged between said head 21 and plate 20.

A pair of like depending arms 23 have their upper ends fixed on the outwardly projecting ends of said pintle 17, and the lower parts of these arms traverse slots in the end parts of a transverse bearing-bar 24 having a pair of clips 28 clamped upon the housing 1. The lower ends of the arms 23 have terminal heads 27 and the arms have annular apertured plates 25 mounted loosely thereon abutting upon the lower surface of the bar 24. A coiled compression-spring 26 is mounted on each arm between the head 27 and the plate 25.

The numeral 35 denotes a closed hollow cylinder, one head 36 of which is detachable and furnished with both an inlet check-valve 37 and an outlet check-valve 38 in valve-chambers 37ᵃ and 38ᵃ respectively. The latter is in communication by way of a hose member 40 with a reservoir for compressed air mounted on some other part of the vehicle not shown in advance of said housing 1. Said reservoir has a delivery pipe 43 controlled by means of a cock 42.

An imperforate piston 34 is fitted to reciprocate within the cylinder 35 and has a stem 33 which traverses a central aperture in the head 36. This stem has a terminal cross-pintle 31 which carries upon its end parts the anti-friction rollers 32. The stem 33 extends into a narrow longitudinal slot 30 in the lower face of the walking-beam opposite its forked end 16. The rollers 32 move through the widened cavity 29 which opens downwardly by way of the slot 30.

The cavities 14 and 29 permit rocking play of the end parts of the walking-beam 4 limitedly. The beam 4 may rock horizontally where swiveled at 6—7, to permit free play of the beam as displacements of the frame 2 occur from time to time relative to the axle-housing 1 during the progress of the vehicle over more or less rough ways. The cylinder base 44 which is offset or projected more widely outwardly enters the hollow beneath the standard shoulder 9 at 10. The cylinder may therefore have some rocking movement upon the housing 1 as restrained by said shoulder, for the clamps 39 are somewhat loosely mounted on said housing. The arms 18 and 23 are passed through widened apertures in the bearing-bars 19 and 24 respectively, so that some flexibility is allowed here. Because of the great flexibility of the structures of the Ford car, these adaptations of my device as to flexibility thereof prevents breakages.

While traveling, the structural parts 1 and 2 of a vehicle like the above have relative movements to and from each other of varying scope. Up and down movements of the oscillatory frame 2 by means of its sliding connection with the inner end of the walking-beam 4 rocks the beam back and forth on the pintle 6. The piston-rod or stem 33 is by the action of the other end of the beam 4 with its like sliding connection given an up and down reciprocation. Air drawn into the cylinder 35 by way of the valve 37 on the suction stroke of the piston is compressed and forced through the outlet-valve 38 to the reservoir 41 for storage there until drawn off for any desired use.

It will be noted that the air in the bottom of the cylinder 35 acts as a shock-absorbing cushion on the down stroke, and the air above in a similar way on the upstroke of the piston 34, while the oppositely acting springs 22 and 26 also act as resilient shock absorbers. Because of this, rear vehicle springs may be omitted, being replaced by the above means in absorbing shocks.

Having described my invention, what I claim as new, and desire to secure by Letters Patent, is:

1. In combination in a vehicle, running gear and a frame member positioned for oscillatory movements adjacent the running gear, a lever pivoted intermediate its ends on the running gear, a loose connection between one end of the lever and said frame, and a dash-pot mounted on the running gear containing a piston having a loose connection to the other end of said lever.

2. In combination in a vehicle, running gear and a frame member positioned for oscillatory movements adjacent the running gear and above it, a lever swiveled intermediate its ends on the running gear, a loose connection between one end of said lever and said frame, a dash-pot mounted for limited movements on said running gear and containing a piston having a loose connection to the other end of said lever, and yieldable resilient connections between the first-mentioned end of said lever and said frame member.

3. The combination with spaced relatively movable elements of a vehicle, of a closed cylinder with one head apertured and mounted upon one of the elements, said cylinder having in the same head valve-controlled inlet- and outlet-ports, an imperforate piston in said cylinder having a stem projecting through the aperture of said head, a lever swiveled intermediate its ends to said element, a loose connection between one end of said lever and said piston stem, and a loose connection between the other end of said lever and the other element.

4. The combination with spaced relatively movable elements of a vehicle, of a closed cylinder having one head apertured and mounted upon one element for slight movements thereupon, said head containing valve-controlled inlet- and outlet-ports, a reservoir in communication with the cylinder outlet-port, a lever swiveled intermediate its ends upon said element and having a loose connection at one end with the other element, a piston movably fitted within said cylinder and having a stem projecting through the said head aperture and having a loose connection with the other end of said lever, and resilient connections with the first-mentioned end of said lever and said running gear and second mentioned element.

In testimony whereof I affix my signature.

ELVIE LANDON.